United States Patent [19]

Kawami et al.

[11] Patent Number: 4,677,669

[45] Date of Patent: Jun. 30, 1987

[54] BATTERY FEED CIRCUIT FOR A PAIR OF SUBSCRIBER LINES

[75] Inventors: Shigeru Kawami, Kawasaki; Takashi Tabu; Mitsutoshi Ayano, both of Tokyo; Kiyoshi Shibuya, Kawasaki; Shin-ichi Itoh, Tokyo, all of Japan

[73] Assignee: Fujitsu Limited, Kawasaki, Japan

[21] Appl. No.: 737,165

[22] Filed: May 23, 1985

[30] Foreign Application Priority Data

May 30, 1984 [JP] Japan .................................. 59-108500

[51] Int. Cl.$^4$ ........................................... H04M 19/06
[52] U.S. Cl. ..................................... 379/413; 379/399
[58] Field of Search ............ 179/70, 81 R, 77, 16 AA, 179/16 F, 18 FA

[56] References Cited

U.S. PATENT DOCUMENTS 4,433,213  2/1984  Albers et al. ................. 179/16 F X Primary Examiner—James L. Dwyer
Attorney, Agent, or Firm—Staas & Halsey

[57] ABSTRACT

Battery feed circuit for a pair of subscriber lines includes a voltage drive circuit with an operational amplifier having a predetermined output impedance determined by an alternating current terminal impedance for the pair of subscriber lines. Both voice signals and induced noise signals are terminated by the voltage drive circuit. The voltage drive circuit is connected in parallel with an electronic inductance circuit, between one of the subscriber lines and ground or a direct current voltage supply.

9 Claims, 6 Drawing Figures

BATTERY FEED CIRCUIT FOR A PAIR OF SUBSCRIBER LINES

BACKGROUND OF THE INVENTION

1. Field of the Invention

The present invention relates to a battery feed circuit for a pair of subscriber lines, more particularly to a battery feed circuit with an internal termination, wherein the battery feed circuit itself forms an alternating current terminal, which is constituted to provide a desired alternating current terminal impedance.

2. Description of the Related Art

A subscriber line circuit in a digital switching system is provided with so-called BORSCHT functions, e.g., battery feed, overvoltage protection, ringing, supervision, codec, hybrid, and test functions. The present invention deals with a battery feed circuit which is arranged in a subscriber line circuit in order to carry out the battery feed function.

Battery feed circuits for supplying a speech current of direct current from an exchange to subscriber lines or trunk circuits are generally constructed to provide a direct-current feed resistance of, for instance, 200 ohms or 220 ohms and a high alternating-current terminal impedance to prevent a voice signal from transmission. In a subscriber line it is required that alternating current be terminated by a predetermined value (for instance, 600 ohms) of alternating current impedance. For satisfying these requirements, there is available in the prior art a battery feed circuit which uses inductance elements such as a transformer, coil or other devices and a termination circuit with a predetermined alternating current impedance. Such battery feed circuits, however, are not suitable for recent integrated circuits and large-scale integrated circuits. For this reason, it is expected that the battery feed circuit be constituted only by electronic components such as transistors. As it is necessary that such electronic feed circuits operate as inductance components, they are designated electronic inductance circuits. They have an alternating current component with an impedance of tens of kilohms or more. Since they exhibit a very high impedance in the alternating current component, a terminal circuit having a terminal impedance of, for instance, 600 ohms must be added. Here, it should be noted that while it is possible to cancel alternating current induced voltage having a longitudinal mode signal with coils or transformers, this is not possible with the above-described electronic inductance circuit. In other words, since the ground impedance against the induced noise is high, e.g., tens of kilohms, the alternating current induced voltage cannot be suppressed and it becomes excessively high, surpassing the power supply voltage of the internal components, such as operational amplifiers in the electronic inductance circuit. This results in saturation distortion in the alternating current signal and thus distortion in the voice signal. Therefore, there is the disadvantage of insufficient ability to withstand alternating current induced noise.

SUMMARY OF THE INVENTION

It is an object of the present invention to provide a battery feed circuit utilizing an electronic inductance circuit, wherein a desired alternating current terminal impedance can be formed.

It is another object of the present invention to provide a battery feed circuit utilizing an electronic inductance circuit, wherein the ability to withstand alternating current induced noise is improved due to low ground impedance.

According to one aspect of the present invention, the above objects are attained by a battery feed circuit, arranged independently for each pair of subscriber lines, including a voltage drive circuit with an operational amplifier circuit having a predetermined output impedance determined by an alternating current terminal impedance for the pair of subscriber lines. Voice signals and induced noise signals are terminated by the voltage drive circuit.

According to another aspect of the present invention, there is provided a battery feed circuit, arranged independently for each pair of subscriber lines, including a voltage drive circuit with an operational amplifier circuit having a predetermined output impedance determined by an alternating current terminal impedance for the pair of subscriber lines. Also included is feed means bearing a part of the direct current and supplying the direct current to the pair of subscriber lines. Voice signals and induced noise signals are terminated by the voltage drive circuit.

BRIEF DESCRIPTION OF THE DRAWINGS

The invention will now be explained in greater detail with reference to embodiments thereof which are represented in the accompanying drawings, wherein.

DESCRIPTION OF THE PREFERRED EMBODIMENTS

Before describing the preferred embodiments, a more detailed look will be taken at the related art.

Figure 1:
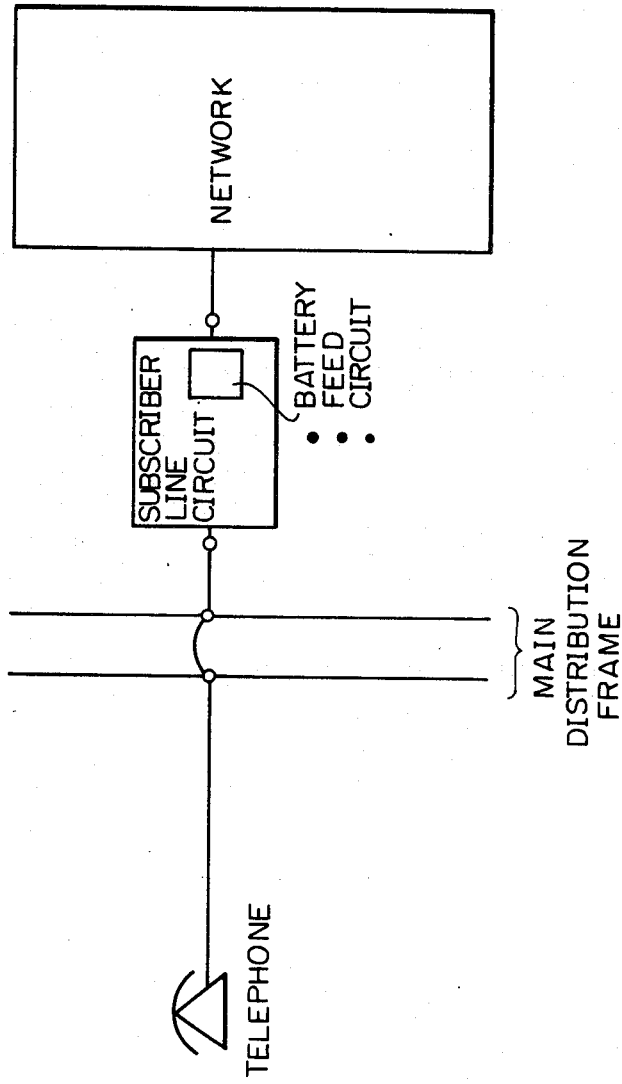
FIG. 1 is a block diagram of a subscriber line circuit in a digital switching system.

FIG. 1 is a simplified block diagram of a subscriber line circuit in a digital switching system. A digital or an analog telephone is connected with a subscriber line circuit through a main distribution frame. The subscriber line circuit contains a battery feed circuit and is connected to a switching network.

Figure 2:
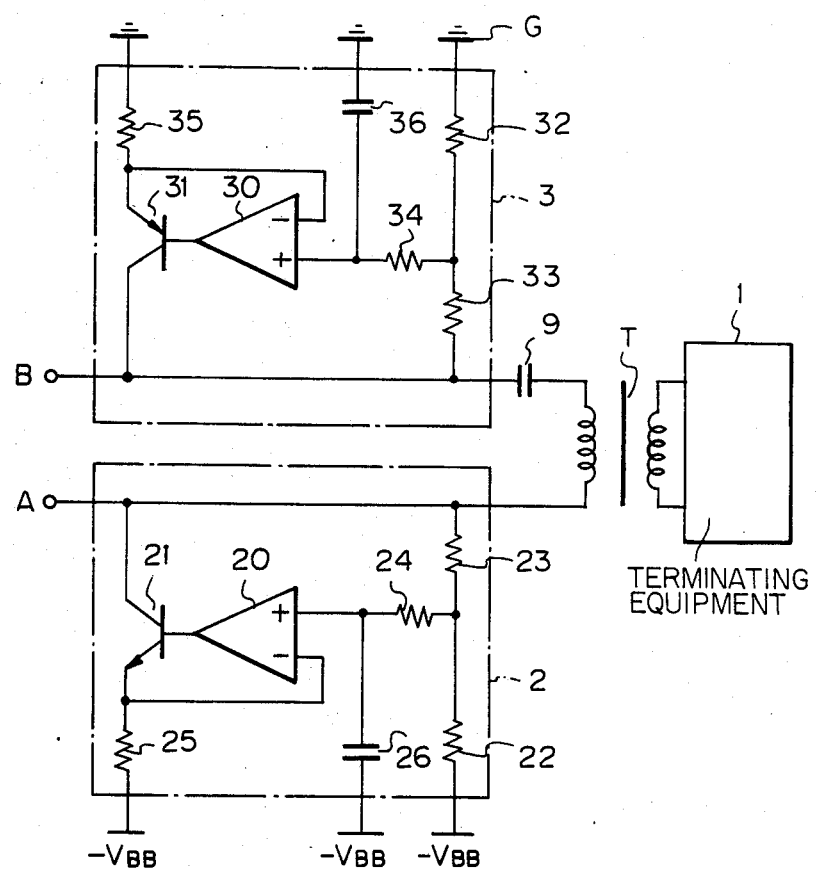
FIG. 2 is a circuit diagram of a prior art battery feed circuit using an equivalent inductance circuit.

FIG. 2 illustrates a prior art battery feed circuit in a subscriber line circuit using an equivalent inductance circuit. In FIG. 2, A and B denote subscriber lines, 2 and 3 circuits for forming electronic inductance, 1 terminating equipment and a hybrid circuit, and T a transformer. Reference symbols 21 and 31 denote transistors, 20 and 30 operational amplifiers, 22 to 25 and 32 to 35 resistors, 26, 36, and 9 capacitors, $-V_{BB}$ a power supply voltage of, for instance, $-48$ V, and G ground.

Electronic inductance circuits 2 and 3 supply direct current to line A and line B are symmetric in constitution. The circuits function so that alternating current signals are bypassed by the capacitors 26 and 36. The transistors 21 and 31 are controlled by the operational amplifiers 20 and 30, so that the voltage across the resistors 22 and 32 becomes equal to the voltage across the resistors 23 and 33.

Accordingly, the electronic inductance circuits exhibit a feeding resistance as a direct current component to the lines A and B as follows:

$$R_{25}(R_{22}+R_{23})/R_{22}=R_{35}(R_{32}+R_{33})/R_{32} \qquad (1)$$

where the subscripts of "R" denote the corresponding resistors in FIG. 2. The electronic inductance circuits 2 and 3 exhibit a ground impedance as an alternating current component between line B and the ground G and between line A and the power supply $V_{BB}$ as follows:

$$R_{22}+R_{23}=R_{32}+R_{33} \qquad (2)$$

Generally, the resistors 22 through 25 and 32 through 35 are set so the feeding resistance to direct current is 200 ohms or so, as described above. The electronic inductance circuits 2 and 3 operate as if they have an inductance component, as the name implies, so they have an alternating current component with an impedance of tens of kilohms or more because the resistance of resistors 22, 23, 32 and 33 is set to a high resistance value.

Figure 3:
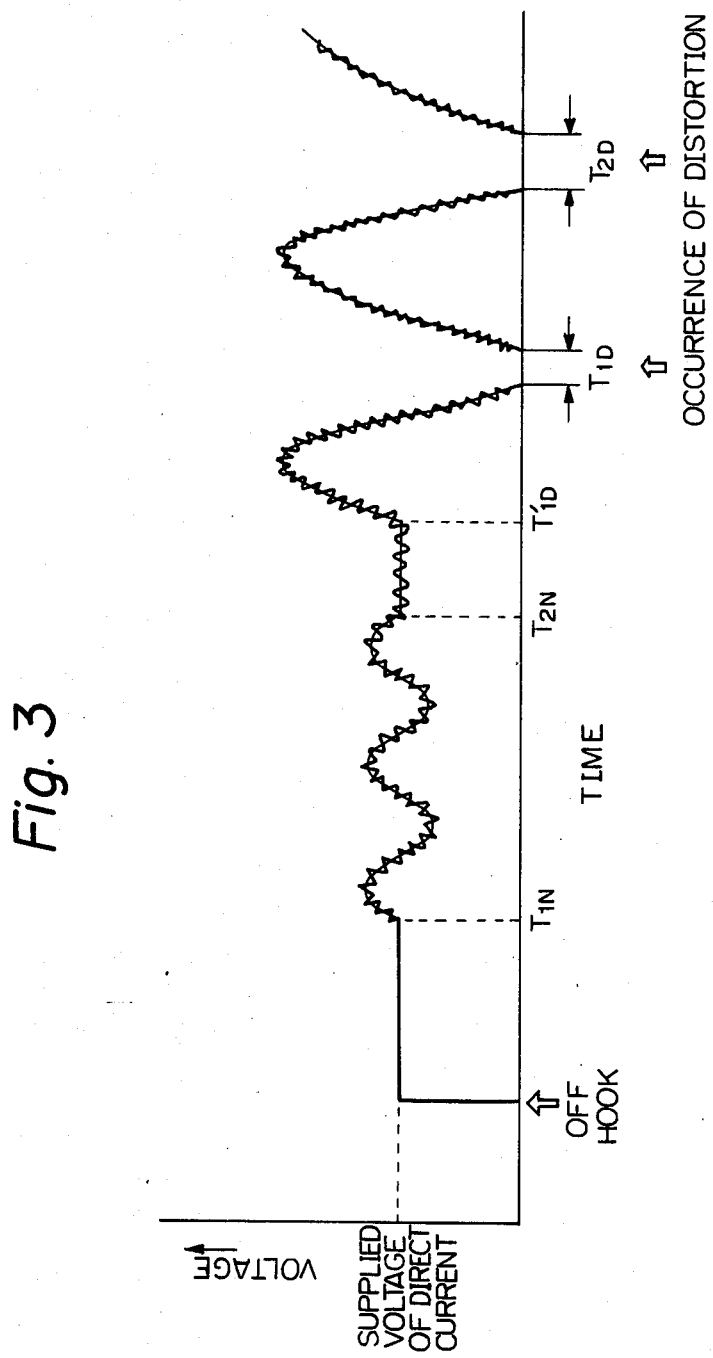
FIG. 3 is a waveform of an induced noise signal causing distortion of a voice signal in a subscriber line.

As described above, the feed circuit illustrated in FIG. 2 exhibits very high impedance in the alternating current component. As a result, a terminal circuit, having the terminal impedance of, for instance, 600 ohms required for terminating the alternating current signal (the voice signal which has a transverse mode) from the subscriber line or trunk line, must be added to the above described battery feed circuit. But when the ground impedance is high, e.g., tens of kilohms for an alternating current signal (the induced noise which has a longitudinal mode), the alternating current inductive voltage which cannot be suppressed becomes high, surpassing the power supply voltage of the operational amplifiers 20 and 30 in the electronic inductance circuit. This results in the previously discussed problems. FIG. 3 depicts the distortion in the voice signal due to the above problem. In the off-hook state, direct current is supplied from the battery feed circuit and the subscriber lines are at a predetermined direct current potential. The alternating current induced voltage is applied between the subscriber lines and the ground. When the alternating current induced voltage is low, as shown in the region $T_{1N}$ and $T_{2N}$, the voice signal superposed thereupon does not distort, which is shown by small superposed waveforms. On the contrary, as shown from the point $T'_{1D}$ on, when the alternating current induced voltage is high, a part of the waveforms is broken off, so the voice signal superposed on the broken part is interrupted and distorts. For this reason, it is necessary that a high alternating current induced voltage not be applied thereto.

Figure 4:
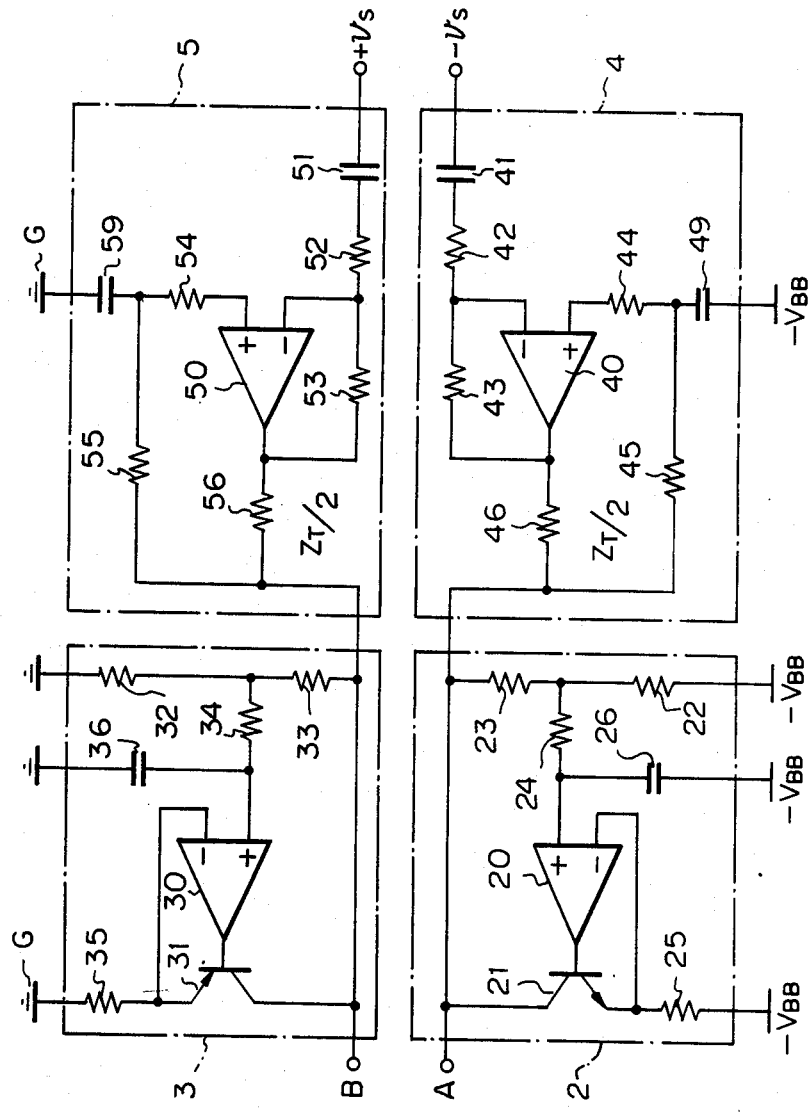
FIG. 4 is a circuit diagram of a battery feed circuit for a pair of subscriber lines in a first embodiment of the present invention.

FIG. 4 is a circuit diagram of a battery feed circuit for a pair of subscriber lines in a first embodiment of the present invention. In FIG. 4, voltage drive circuits 4 and 5 are connected in parallel with the electronic inductance circuits 2 and 3, respectively.

The voltage drive circuits 4 and 5 are composed of operational amplifiers 40 and 50, resistors 42 through 46 and 52 through 56, and capacitors 41, 49, 51, and 59. G is the ground, $-V_{BB}$ is a power supply voltage, and $+v_s$ and $-v_s$ are alternating current signals from a feed circuit to a subscriber line or a trunk line.

In the voltage drive circuits 4 and 5, the feedback resistors 43 and 53 are connected between the output terminals of the operational amplifiers 40 and 50 and their inverting input terminals, respectively. The direct current voltages of line A and line B are fed back to the non-inverting input terminal of the operational amplifiers 40 and 50 through the feedback resistors 44, 45 and 54, 55, thus deciding a direct current operating point of the operational amplifiers 40 and 50, respectively. Coupling capacitors 41 and 51 are connected with the inverting input terminals of the operational amplifiers 40 and 50 through the resistors 42 and 52, respectively, to interrupt a direct current. Due to the direct current isolation of the coupling capacitors, the operational amplifiers 40 and 50 become voltage followers for direct current. The reason why the operational amplifiers 40 and 50 are made voltage followers for direct current is that the direct current potential difference across the resistors 46 and 56 is zero and the direct current output current and the direct current power loss is zero.

Each of the operational amplifiers 40 and 50 which has a gain $R_{43}/R_{42}=R_{53}/R_{52}$, operates as an inverting amplifier with respect to an alternating current signal $v_s$, and provides an inverting amplifier output based upon the action of the resistors 42, 43, 52, and 53 and the capacitors 49 and 59, which isolate the alternating current signal.

Generally speaking, the output resistance of an operational amplifier is so low that it may be regarded as zero. The direct current output voltage of the operational amplifiers 40 and 50 is equivalent to the direct current voltage of line A and line B, as described before, so the potentials across the resistors 46 and 56 is equal. Therefore, the resistors 46 and 56 become equivalent to 0 for the direct current component. The internal impedance of the operational amplifiers 40 and 50 viewed from the output terminal is sufficiently low compared with the resistance of the resistors 46 and 56, so that the impedances between line A and line B and the power source $-V_{BB}$ or ground G are equivalent to the value of the resistors 46 and 56 for the alternating current component, respectively.

If the resistors 46 and 56 each have a resistance of $Z_T/2$, the inverting amplifiers, composed of the operational amplifiers 40 and 50, in the voltage drive circuits 4 and 5 become alternating current voltage sources, in which the output voltage is $$v_s \cdot R_{43}/R_{42} = v_s \cdot R_{53}/R_{52},$$

and the output impedance is $$Z_T/2 = R_{46} = R_{56},$$

where $Z_T$ denotes a desired alternating current terminal impedance and is, for instance, 600 ohms.

As line A and line B are both balanced types, the above-mentioned feed circuit divides the alternating current terminal impedance of $Z_T$ into two equal components. Moreover, the resistors 46 and 56 are set so that the output impedance becomes equal to $Z_T/2$ in the voltage drive circuits 4 and 5.

In other words, the voltage drive cricuits 4 and 5 have an output impedance of $Z_T/2$, when an alternating current signal is input from the line A side and the line B side, the above-described alternating current signal $v_s$ is zero and the internal impedances of the operational amplifiers 40 and 50 viewed from the output terminal are sufficiently lower than the resistances $R_{46}$ and $R_{56}$ of the resistors 46 and 56. Thus, the impedances of the voltage drive circuits 4 and 5 viewed from line A and line B are equal to $R_{46}$ and $R_{56}$, that is to say, $Z_T/2$, and the voltage drive circuits 4 and 5 terminate to the power supply side $-V_{BB}$ and ground G. On the other hand, the impedances of the electronic inductance circuits 2 and 3 to the alternating current are considerably higher than the output impedances $Z_T/2$ of the voltage drive circuits 4 and 5. Also, the voltage drive circuits 4 and 5 are connected in parallel with the electronic inductance circuits 2 and 3 between the power supply $-V_{BB}$ and ground G. Therefore, little of the input alternating current signal flows through the electronic inductance circuits 2 and 3, but instead it flows directly through the voltage drive circuits 4 and 5. The impedances of line A and line B with the power source $-V_{BB}$ and ground G are equivalent to $Z_T/2$, as with the output impedance of the voltage drive circuits 4, 5.

Figure 5:
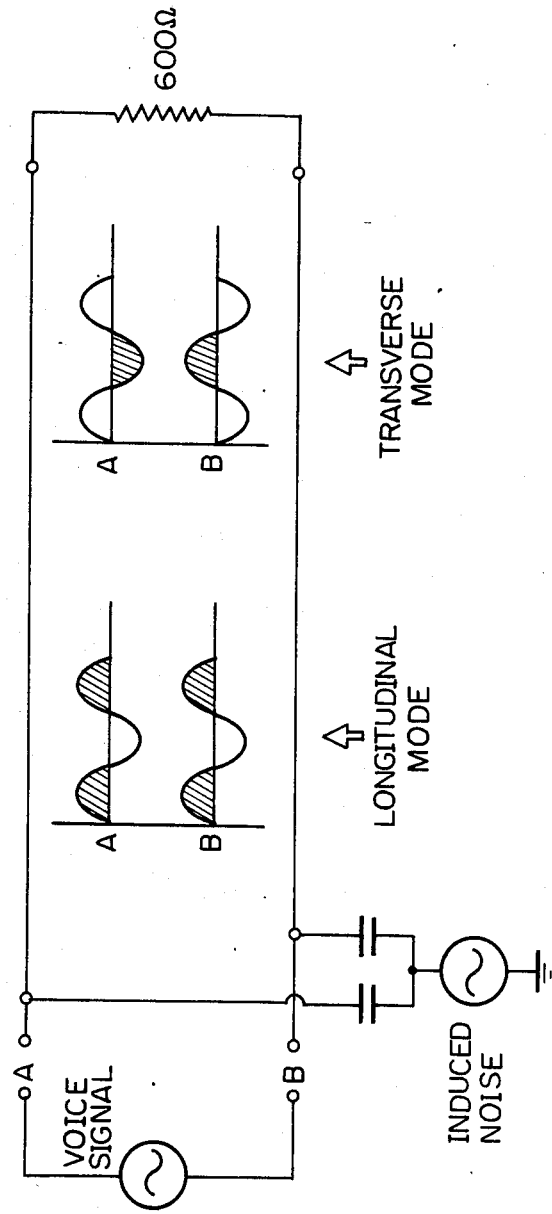
FIG. 5 is an explanatory view of waveforms of signal in line A and line B, in a longitudinal mode and a transverse mode.

As shown in FIG. 5, when the alternating current signals at the line A side and line B side are in a transverse mode of a voice signal, voltage is applied between line A and line B and the impedance between the power source $-V_{BB}$ and ground G can be regarded as zero, so the input alternating current signals run from the voltage drive circuit 5 via the power source $-V_{BB}$ and ground G and through the voltage drive circuit 4 into the line A side. Therefore, the sum of the output impedances of the voltage drive circuits 4 and 5, that is, $$Z_T/2 + Z_T/2 = Z_T$$

exists between line A and line B, and the alternating current terminal impedance between line A and line B is the desired value $Z_T$.

On the contrary, when the alternating current signals are in a longitudinal mode as caused by alternating current induced noise, the alternating current signals are applied in a longitudinal mode both between line A and ground G and between line B and ground G. Consequently, $Z_T/2$ appears in the voltage drive circuit 4 between line A and the power supply $-V_{BB}$, while $Z_T/2$ appears in the voltage drive circuit 5 between line B and the ground G. That is to say, with regard to the transverse mode signal, the circuit is terminated with the desired terminal impedance $Z_T$. With regard to the longitudinal mode signal, the circuit is terminated with as low as half of the terminal impedance $Z_T$. Due to the parallel-connection voltage drive circuits 4 and 5, no excessive voltage occurs in the electronic inductance circuit 2 and 3 with a high ground impedance and, so, no distortion of the voice signal occurs. Thus, there is the advantage of a large ability to withstand alternating current induced noise.

Figure 6:
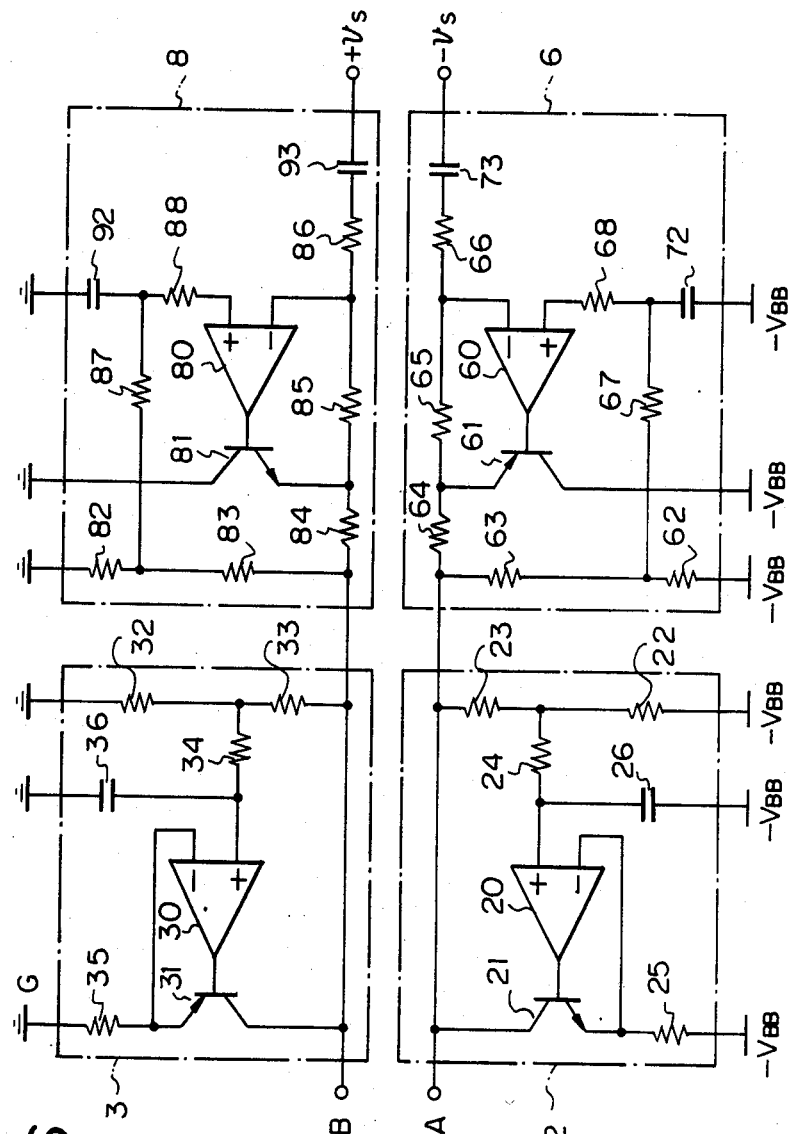
FIG. 6 is a circuit diagram of a battery feed circuit in a second embodiment of the present invention.

FIG. 6 is a circuit diagram of a second embodiment of the present invention, in which elements equivalent to those in FIG. 4 are denoted by the same symbols. In FIG. 6, reference numerals 6 and 8 are voltage drive circuits, 61 and 81 transistors, 60 and 80 operational amplifiers, and 62 through 68 and 82 through 88 resistors. The electronic inductance circuits 2 and 3 have the same constitution as shown in FIG. 4. Compared with the voltage drive circuits 4 and 5 shown in FIG. 4, the voltage drive circuits 6 and 8 are given an added feed function by means of the transistors 61 and 81.

The operational amplifiers 60 and 80, are inverting amplifiers having the gain $$R_{65}/R_{66} = R_{85}/R_{86}$$

for an alternating current signal $v_s$, as in FIG. 4, and are voltage followers for direct current. In FIG. 6, the voltages between line A and the power supply voltage $-V_{BB}$ and between line B and ground G are divided separately by resistors 62, 63, and 82, 83. The divided voltages are added to the non-inverting input terminal of the operational amplifiers 60 and 80 through the feedback resistors 67, 68 and 87, 88. Then, since the operational amplifiers 60 and 80 are voltage followers, a direct current voltage equivalent to the direct current voltage across the resistors 63 and 83 is added to both ends of the resistors 64 and 84. The feed current flows through the transistor 61 and resistor 64 and the transistor 81 and resistor 84. Thus, the direct current feed resistance of the voltage drive circuits 6 and 8, when $$R_{64} = R_{84} = Z_T/2,$$

is $$(Z_T/2)(R_{62}+R_{63})/R_{63} = (Z_T/2)(R_{82}+R_{83})/R_{83} \qquad (3)$$

With regard to an alternating current signal, the voltage drive circuits 6 and 8 are the same as the voltage drive circuits 4 and 5 in FIG. 4 and serve as the power source of alternating current voltages of which the output voltage is $$v_s \cdot R_{65}/R_{66} = v_s \cdot R_{85}/R_{86}$$

and the output impedance is $$Z_T/2 = R_{64} \text{ or } R_{82}.$$

With regard to line A, the direct current feed current of the entire circuit is the sum of the currents which flow through the transistor 21 of the electronic inductance circuit 2 and the transistor 61 of the voltage drive circuit 6. With regard to line B, the direct current feed current of the entire circuit is the sum of the currents which flow through the transistor 31 of the electronic inductance circuit 3 and the transistor 81 of the voltage drive circuit 8. Accordingly, the direct current feed resistance of the entire circuit in FIG. 6 is the parallel composite resistance of the feed resistors of the electronic inductance circuits 2 and 3 and the voltage drive circuits 6 and 8, i.e., $$\left( R_{35} \cdot \frac{R_{32}+R_{33}}{R_{32}} \right) \Big/ \left( \frac{Z_T}{2} \cdot \frac{R_{82}+R_{83}}{R_{83}} \right) = \qquad (4)$$

$$\left( R_{25} \cdot \frac{R_{22}+R_{23}}{R_{22}} \right) \Big/ \left( \frac{Z_T}{2} \cdot \frac{R_{62}+R_{63}}{R_{63}} \right)$$

The alternating current terminal impedance is $Z_T$ with a transverse mode signal and $Z_T/2$ with a longitudinal mode signal, as in the embodiment of FIG. 4.

In comparison with the embodiment shown in FIG. 4, the embodiment of FIG. 6, provides a larger alternating current drive current. Moreover, the direct current feed current is split between transistors 21, 61 and 31, 81, resulting in less problem with heat buildup.

We claim:

1. A battery feed circuit for first and second subscriber lines in a subscriber line pair having an alternating current terminal impedance and receiving input signals, said battery feed circuit comprising:
   a first voltage drive circuit, operatively connected to the first subscriber line, including a first operational amplifier circuit having output impedances determined by the input signals and the alternating current terminal impedance for the subscriber line pair;
   a second voltage drive circuit, operatively connected to the second subscriber line, including a second operational amplifier circuit having output impedances determined by the input signals and the alternating current terminal impedance for the subscriber line pair, voice signals and induced noise signals being terminated by said first and second voltage drive circuits.

2. A battery feed circuit according to claim 1, wherein each of said first and second operational amplifiers is a voltage follower for direct current.

3. A battery feed circuit according to claim 1, wherein each of said first and second operational amplifiers operates as an inverting amplifier for alternating current.

4. A battery feed circuit according to claim 1, wherein said voltage drive circuits provide an impedance $Z_T$ for the voice signals in a transverse mode and an impedance $Z_T/2$ for induced longitudinal noise signals.

5. A battery feed circuit for first and second subscriber lines in a subscriber line pair having an alternating current terminal impedance and receiving input signals, said battery feed circuit operatively connected to a direct current supply and comprising:
   a first voltage drive circuit respectively connected to said first subscriber line, including:
      a first operational amplifier circuit having output impedances determined by the input signals and the alternating current terminal impedance for the subscriber line pair and having an output; and
      first battery feed means, operatively connected to the output of said first operational amplifier, the direct current supply and the first subscriber line, for supplying direct current to the first subscriber line; and
   a second voltage drive circuit, operatively connected to said second subscriber line, including:
      a second operational amplifier circuit having the output impedances determined by the input signal and the alternating current terminal impedance for the subscriber line pair and having an output; and
      second battery feed means, operatively connected to the output of said second operational amplifier, the direct current supply and the second subscriber line, for supplying direct current to the second subscriber line, for supplying direct current to the second subscriber line, voice signals and induced noise signals being terminated by said first and second voltage drive circuits.

6. A battery feed circuit for a subscriber line, operatively connected to a direct current voltage reference, the subscriber line capable of transmitting voice signals and susceptible to induced noise signals, said battery feed circuit comprising:
   electronic inductance means, operatively connected between the direct current voltage reference and the subscriber line, for providing a direct current impedance lower than an alternating current impedance; and
   voltage drive means for supplying power to the subscriber line and for terminating the information and induced noise signals, said voltage drive means comprising an operational amplifier, operatively connected to the subscriber line and the direct current voltage reference, having alternating current output impedances lower than the alternating current impedance of said electronic inductance means.

7. A battery feed circuit according to claim 6,
   wherein the subscriber line has a terminal,
   wherein said operational amplifier has inverting and noninverting input terminals and an output terminal, and
   wherein said voltage drive circuit further comprises:
      a first capacitor having a first terminal operatively connected to the direct current voltage reference and having a second terminal;
      a first resistor having a first end operatively connected to the second terminal of said first capacitor and having a second end operatively connected to the noninverting input terminal of said operational amplifier;
      a second resistor having a first end operatively connected to the second terminal of said first capacitor and having a second end operatively connected to the subscriber line;
      a third resistor operatively connected between the output of said operational amplifier and the second end of said second resistor;
      a fourth resistor operatively connected between the output and the inverting input of said operational amplifier; and
      a fifth resistor and a second capacitor operatively connected in series between the inverting input of said operational amplifier and the terminal of the subscriber line.

8. A battery feed circuit according to claim 6,
   wherein said operational amplifier has an output, and
   wherein said battery feed circuit further comprises a transistor, having first and second terminals operatively connected to the direct current voltage reference and the subscriber line, respectively, and having a control terminal operatively connected to the output of said operational amplifier, for supplying the direct current voltage reference to the subscriber line in conjunction with said electronic induction means.

9. A battery feed circuit according to claim 8,
   wherein the subscriber line has a terminal,
   wherein said operational amplifier has inverting and noninverting input terminals, and
   wherein said battery feed circuit further comprises:
      a first capacitor having a first terminal operatively connected to the direct current voltage reference and having a second terminal;
      a first resistor operatively connected between the second terminal of said first capacitor and the noninverting terminal of said operational amplifier;
      a second resistor having a first end operatively connected to the voltage reference and having a second end;

a third resistor operatively connected between the second terminal of said first capacitor and the second end of said second resistor;

a fourth resistor having a first end operatively connected to the second end of said second resistor and having a second end operatively connected to the subscriber line;

a fifth resistor operatively connected between the second end of said fourth resistor and the second terminal of said transistor;

a sixth resistor operatively connected between the second terminal of said transistor and the inverting terminal of said operational amplifier; and a seventh resistor and a second capacitor operatively connected in series between the noninverting terminal of said operational amplifier and the terminal of the subscriber line.

* * * * *